US006992666B2

(12) United States Patent  
Hiraki et al.

(10) Patent No.: US 6,992,666 B2  
(45) Date of Patent: Jan. 31, 2006

(54) 3-DIMENSIONAL-MODEL-PROCESSING APPARATUS, 3-DIMENSIONAL-MODEL PROCESSING METHOD AND PROGRAM-PROVIDING MEDIUM

(75) Inventors: Norikazu Hiraki, Tokyo (JP); Hiroyuki Segawa, Kanagawa (JP); Hiroyuki Shioya, Tokyo (JP); Yuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 09/859,020

(22) Filed: May 15, 2001

(65) Prior Publication Data

US 2002/0008720 A1    Jan. 24, 2002

(30) Foreign Application Priority Data

May 15, 2000    (JP)    ............................ P2000-141936

(51) Int. Cl.  
*G06T 15/00* (2006.01)

(52) U.S. Cl. ...................... 345/419; 345/420; 345/473; 463/31

(58) Field of Classification Search ................ 345/158, 345/531, 419, 420, 157, 161, 473, 156, 51; 463/32, 31, 37, 38; 715/848; 700/97, 98, 700/182  
See application file for complete search history.

(56) References Cited

U.S. PATENT DOCUMENTS

| | | | | |
|---|---|---|---|---|
| 4,607,255 | A * | 8/1986 | Fuchs et al. .................. 345/31 |
| 5,652,603 | A * | 7/1997 | Abrams ....................... 345/157 |
| 6,020,891 | A * | 2/2000 | Rekimoto .................... 345/419 |
| 6,072,903 | A * | 6/2000 | Maki et al. .................. 382/190 |
| 6,115,028 | A * | 9/2000 | Balakrishnan et al. ...... 345/157 |
| 6,141,015 | A * | 10/2000 | Tanaka ....................... 345/427 |
| 6,144,385 | A * | 11/2000 | Girard ........................ 345/424 |
| 6,222,465 | B1 * | 4/2001 | Kumar et al. ................ 341/20 |
| 6,267,674 | B1 * | 7/2001 | Kondo et al. ................ 463/32 |
| 6,276,799 | B1 * | 8/2001 | Van Saarloos et al. ..... 351/206 |
| 6,297,799 | B1 * | 10/2001 | Knittel et al. ............... 345/419 |
| 6,307,563 | B2 * | 10/2001 | Kimura ...................... 345/474 |
| 6,308,144 | B1 * | 10/2001 | Bronfeld et al. ............... 703/2 |
| 6,310,619 | B1 * | 10/2001 | Rice ........................... 345/420 |
| 6,411,266 | B1 * | 6/2002 | Maguire, Jr. .................. 345/8 |

* cited by examiner

*Primary Examiner*—Alexander Eisen  
*Assistant Examiner*—Abbas Abdulselam  
(74) *Attorney, Agent, or Firm*—Bell, Boyd & Lloyd LLC

(57) ABSTRACT

Disclosed is a 3-dimensional model-processing apparatus capable of processing a 3-dimensional model appearing on a display unit including a sensor for generating information on the position and the posture, which can be controlled by the user arbitrarily, and control means for carrying out a grasp-state-setting process of taking a relation between the sensor-generated information on the position and the posture of the sensor and information on the position and the posture of the 3-dimensional model appearing on the display unit as a constraint relation on the basis of a relation between the 3-dimensional position of the 3-dimensional model appearing on the display unit and the 3-dimensional position of a tool appearing on the display unit for the sensor or on the basis of a relation between the 3-dimensional posture of the 3-dimensional model appearing on the display unit and the 3-dimensional posture of the tool appearing on the display unit for the sensor.

16 Claims, 13 Drawing Sheets

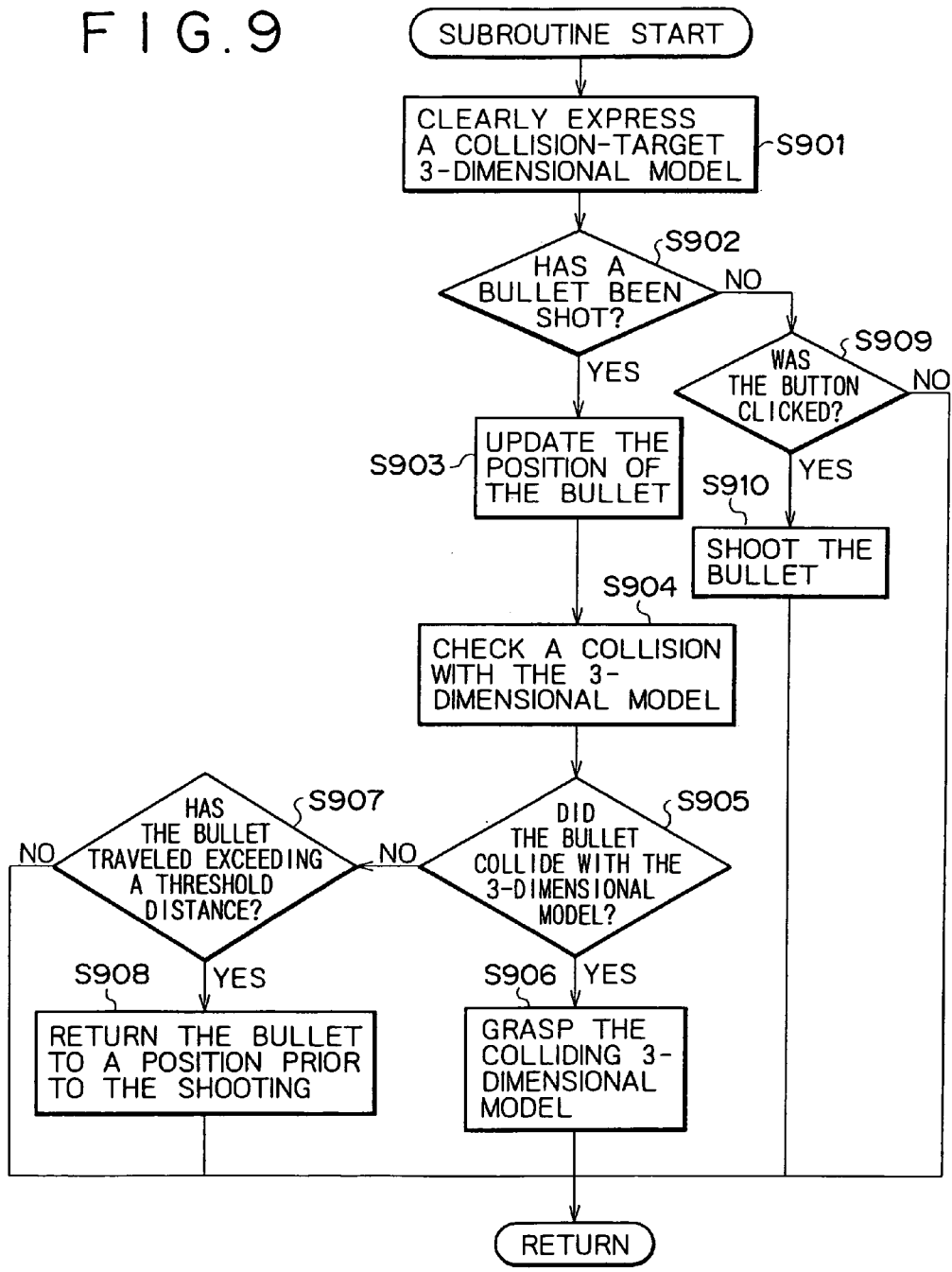

F I G. 1 1 A      F I G. 1 1 B

3-DIMENSIONAL-MODEL-PROCESSING APPARATUS, 3-DIMENSIONAL-MODEL PROCESSING METHOD AND PROGRAM-PROVIDING MEDIUM

BACKGROUND OF THE INVENTION

The present invention relates to a 3-dimensional-model-processing apparatus, a 3-dimensional-model-processing method and a program-providing medium. More particularly, the present invention relates to a 3-dimensional-model-processing apparatus and a 3-dimensional-model-processing method which allow the user to experience a grasp process carried out to control a 3-dimensional model appearing on a display unit during processing, such as movement or rotation of the 3-dimensional model, and relates to a program-providing medium for storing the 3-dimensional-model-processing method.

Various kinds of contemporary graphic equipment such as a computer, a CAD tool and a CG graphic apparatus are capable of carrying out a variety of 3-dimensional-model processes.

Processing, such as movement or rotation of the 3-dimensional model appearing on a display unit, is carried out by execution of existing computer graphic software or 3-dimensional CAD software. In this case, the position to display a 3-dimensional model defined in a 3-dimensional space is specified by using a 2-dimensional pointer, such as a cursor representing information on a 2-dimensional position. The 2-dimensional pointer is controlled by an input device, such as a keyboard or a mouse. The position to display a 3-dimensional model is specified to grasp the 3-dimensional model in order to carry out the processing, such as movement or rotation of the 3-dimensional model, by maintaining a position of the 3-dimensional model relative to the cursor.

With such a conventional configuration, however, a 3-dimensional model is operated by using a 2-dimensional pointer. Thus, the operation is not carried out intuitively. In addition, for a user unfamiliar with the conventional model-processing apparatus and the conventional model-processing method, the operation can be cumbersome.

On the other hand, there is also implemented a configuration that allows such an operation to be carried out more intuitively and to a sense of operating a real object by directly reflecting signals in the 3-dimensional position of a 3-dimensional model and information on the posture of the 3-dimensional model. The signals are normally generated by a 3-dimensional sensor capable of measuring the 3-dimensional position of a 3-dimensional model and information on the posture of the 3-dimensional model.

If there is only one 3-dimensional model to be displayed, the model is assigned permanently to a 3-dimensional sensor. If there is a plurality of 3-dimensional models to be displayed, on the other hand, processing and means for switching the operating sensor from one model to another are required.

SUMMARY OF THE INVENTION

An advantage of the present invention, addressing the problems described above, is to provide a 3-dimensional-model-processing apparatus and a 3-dimensional-model-processing method wherein a 3-dimensional pointer (a grasp tool) having information on a 3-dimensional position and information on a posture, which can be controlled with a high degree of freedom, is defined in a 3-dimensional space, and wherein processing to switch a 3-dimensional model to be moved and rotated can be carried out by using the grasp tool, and to provide a program-providing medium for storing the 3-dimensional-model-processing method.

According to an embodiment of the present invention, a 3-dimensional model-processing apparatus is provided which is capable of processing a 3-dimensional model appearing on a display unit, including a sensor for generating information on the position and the posture, which can be arbitrarily controlled by the user, and control means for carrying out a grasp-state-setting process of taking a relation between the sensor-generated information on the position and the posture of the sensor and information on the position and the posture of the 3-dimensional model appearing on the display unit as a constraint relation on the basis of a relation between the 3-dimensional position of the 3-dimensional model appearing on the display unit and the 3-dimensional position of a tool appearing on the display unit for the sensor or on the basis of a relation between the 3-dimensional posture of the 3-dimensional model appearing on the display unit and the 3-dimensional posture of the tool appearing on the display unit for the sensor.

Preferably, the sensor has a button used as event input means and the control means has a configuration for determining that the tool appearing on the display unit is inside the 3-dimensional model and for carrying out the grasp-state-setting process in the event of an input received from the button.

Preferably, the sensor has a button used as an event input means and the control means has a configuration for determining that the tool appearing on the display unit is in contact with a surface of the 3-dimensional model and for carrying out the grasp-state-setting process in the event of an input received from the button.

The control means preferably has a configuration for selecting a 3-dimensional model crossed by a straight optical beam generated in a specific direction by the tool appearing on the display unit and for carrying out the grasp-state-setting process on the selected 3-dimensional model.

The control means preferably has a configuration for selecting a 3-dimensional model hit by a flying object emanating in a specific direction from the tool appearing on the display unit and for carrying out the grasp-state-setting process on the selected 3-dimensional model.

The control means preferably has a configuration which is used for executing control to display the flying object on the display unit as a flying object emanating from the tool appearing on the display unit along a predetermined straight line or a predetermined curved line.

The control means preferably has a configuration which is used for executing control to display the flying object stuck on a surface of a 3-dimensional model appearing on the display unit when the flying object hits the 3-dimensional model.

The control means preferably has a configuration which is used for executing control to display the flying object stuck on a surface of a 3-dimensional model appearing on the display unit when the flying object hits the 3-dimensional model, and for carrying out processing to move the 3-dimensional model with the flying object stuck on the surface thereof to a position of the tool.

The control means preferably has a configuration which is used for executing control to display the flying object stuck on a surface of a 3-dimensional model appearing on the display unit when the flying object hits the 3-dimensional model, and for carrying out processing to return the flying object from a stuck position on the surface of the 3-dimensional model to a position of the tool when a cancel input is received by the sensor provided in advance.

The control means preferably has a configuration for selecting a 3-dimensional model existing in an effect range set in a 3-dimensional space area with an origin coinciding with the tool appearing on the display unit and for carrying out the grasp-state-setting process on the selected 3-dimensional model.

The control means preferably has a configuration for moving a 3-dimensional model appearing on the display unit to a position of the tool if the 3-dimensional model exists in the effect range.

The control means preferably has a configuration for executing control to remove an appearance of the tool from the display unit after a start of the grasp-state-setting process.

The control means preferably has a configuration for executing control to update a position and a posture of the 3-dimensional model appearing on the display unit in accordance with information on a position and a posture obtained from the sensor after a start of the grasp-state-setting process.

The control means preferably has a configuration for identifying the area of a 3-dimensional model appearing on the display unit by recognizing a bounding-box area including the 3-dimensional model, an internal area of the 3-dimensional model or a bounding sphere displayed as a smallest sphere including the 3-dimensional model.

The control means preferably has a configuration for executing control to display a specific 3-dimensional model subjected to the grasp-state-setting process by distinguishing the specific 3-dimensional model from other 3-dimensional models appearing on the display unit.

In accordance with another embodiment of the present invention, a 3-dimensional model-processing method is provided which is capable of processing a 3-dimensional model appearing on a display unit, including the steps of allowing the user to arbitrarily control information on a position and a posture, which is generated by a sensor, and carrying out a grasp-state-setting process of taking a relation between the sensor-generated information on a position and a posture of the sensor and information on a the position and a posture of the 3-dimensional model appearing on the display unit as a constraint relation on the basis of a relation between a 3-dimensional position of the 3-dimensional model appearing on the display unit and the 3-dimensional position of a tool appearing for the sensor on the display unit or on the basis of a relation between a 3-dimensional posture of the 3-dimensional model appearing on the display unit and a 3-dimensional posture of the tool appearing for the sensor on the display unit.

Preferably, the step of carrying out the grasp-state-setting process includes the steps of determining that the tool appearing on the display unit is inside the 3-dimensional model, and carrying out the grasp-state-setting process in the event of an input received from a button used as event input means of the sensor.

Preferably, the step of carrying out the grasp-state-setting process includes the steps of determining that the tool appearing on the display unit is in contact with a surface of the 3-dimensional model, and carrying out the grasp-state-setting process in the event of an input received from a button used as event input means of the sensor.

Preferably, the step of carrying out the grasp-state-setting process includes the steps of selecting a 3-dimensional model crossed by a straight optical beam generated in a specific direction by the tool appearing on the display unit, and carrying out the grasp-state-setting process on the selected 3-dimensional model.

Preferably, the step of carrying out the grasp-state-setting process includes the steps of selecting a 3-dimensional model hit by a flying object emanating in a specific direction from the tool appearing on the display unit, and carrying out the grasp-state-setting process on the selected 3-dimensional model.

Preferably, at the step of carrying out the grasp-state-setting process, control is executed to display the flying object on the display unit as a flying object emanating from the tool appearing on the display unit along a predetermined straight line or a predetermined curved line.

Preferably, at the step of carrying out the grasp-state-setting process, control is executed to display the flying object stuck on a surface of a 3-dimensional model appearing on the display unit when the flying object hits the 3-dimensional model.

Preferably, the step of carrying out the grasp-state-setting process includes the steps of executing control to display the flying object stuck on a surface of a 3-dimensional model appearing on the display unit when the flying object hits the 3-dimensional model, and carrying out processing to move the 3-dimensional model with the flying object stuck on the surface thereof to a position of the tool.

Preferably, the step of carrying out the grasp-state-setting process includes the steps of executing control to display the flying object stuck on a surface of a 3-dimensional model appearing on the display unit when the flying object hits the 3-dimensional model, and carrying out processing to return the flying object from a stuck position on the surface of the 3-dimensional model to a position of the tool when a cancel input is received by the sensor provided in advance.

Preferably, the step of carrying out the grasp-state-setting process includes the steps of selecting a 3-dimensional model existing in an effect range set in a 3-dimensional space area with an origin coinciding with the tool appearing on the display unit, and carrying out the grasp-state-setting process on the selected 3-dimensional model.

Preferably, at the step of carrying out the grasp-state-setting process, a 3-dimensional model appearing on the display unit is moved to a position of the tool if the 3-dimensional model exists in the effect range.

Preferably, at the step of carrying out the grasp-state-setting process, control is executed to remove an appearance of the tool from the display unit after a start of the grasp-state-setting process.

Preferably, at the step of carrying out the grasp-state-setting process, control is executed to update a position and a posture of the 3-dimensional model appearing on the display unit in accordance with information on a position and a posture obtained from the sensor after a start of the grasp-state-setting process.

Preferably, at the step of carrying out the grasp-state-setting process, the area of a 3-dimensional model appearing on the display unit is identified by recognizing a bounding-box area including the 3-dimensional model, an internal area of the 3-dimensional model or a bounding sphere displayed as a smallest sphere including the 3-dimensional model.

Preferably, at the step of carrying out the grasp-state-setting process, control is executed to display a specific 3-dimensional model subjected to the grasp-state-setting process by distinguishing the specific 3-dimensional model from other 3-dimensional models appearing on the display unit.

In accordance with a another embodiment of the present invention, a program-providing medium for a computer program to be executed on a computer system to carry out 3-dimensional model processing to process a 3-dimensional model appearing on a display unit is provided, the computer program including the steps of allowing the user to arbitrarily control information on a position and a posture, which is generated by a sensor, and carrying out a grasp-state-setting process of taking a relation between the sensor-generated information on a position and a posture of the sensor and information on a position and a posture of the 3-dimensional model appearing on the display unit as a constraint relation on the basis of a relation between a 3-dimensional position of the 3-dimensional model appearing on the display unit and the 3-dimensional position of a tool appearing for the sensor on the display unit or on the basis of a relation between a 3-dimensional posture of the 3-dimensional model appearing on the display unit and a 3-dimensional posture of the tool appearing for the sensor on the display unit.

The above program-providing medium may be a medium for providing the computer program in a computer-readable format to a typical general-purpose computer system capable of executing a variety of programs. Examples of the program-providing medium are a storage medium such as a CD (compact disc), an FD (floppy disc) or an MO (magneto-optical) disc and a transmission medium such as a network. The format of the program-providing medium is not prescribed in particular.

Such a program-providing medium defines a structural and functional cooperative relation between the computer program and the providing medium to implement predetermined functions of the computer program on the general-purpose computer system. In other words, by installation of the computer program from the program-providing medium in the general-purpose computer system, effects of collaboration can be displayed on the computer system and the same effects as the other aspects of the present invention can thus be obtained.

Other objects, features and merits of the present invention will probably become apparent from the following detailed description of preferred embodiments of the present invention with reference to accompanying diagrams.

BRIEF DESCRIPTION OF THE FIGURES

FIG. 9 is a flowchart representing a fourth procedure of the grasp judgment processing in the 3-dimensional-model-processing apparatus provided by the present invention;

DETAILED DESCRIPTION OF THE INVENTION OF THE PREFERRED EMBODIMENTS OF THE INVENTION

Preferred embodiments of the present invention will be described in detail with reference to the drawings.

Figure 1:
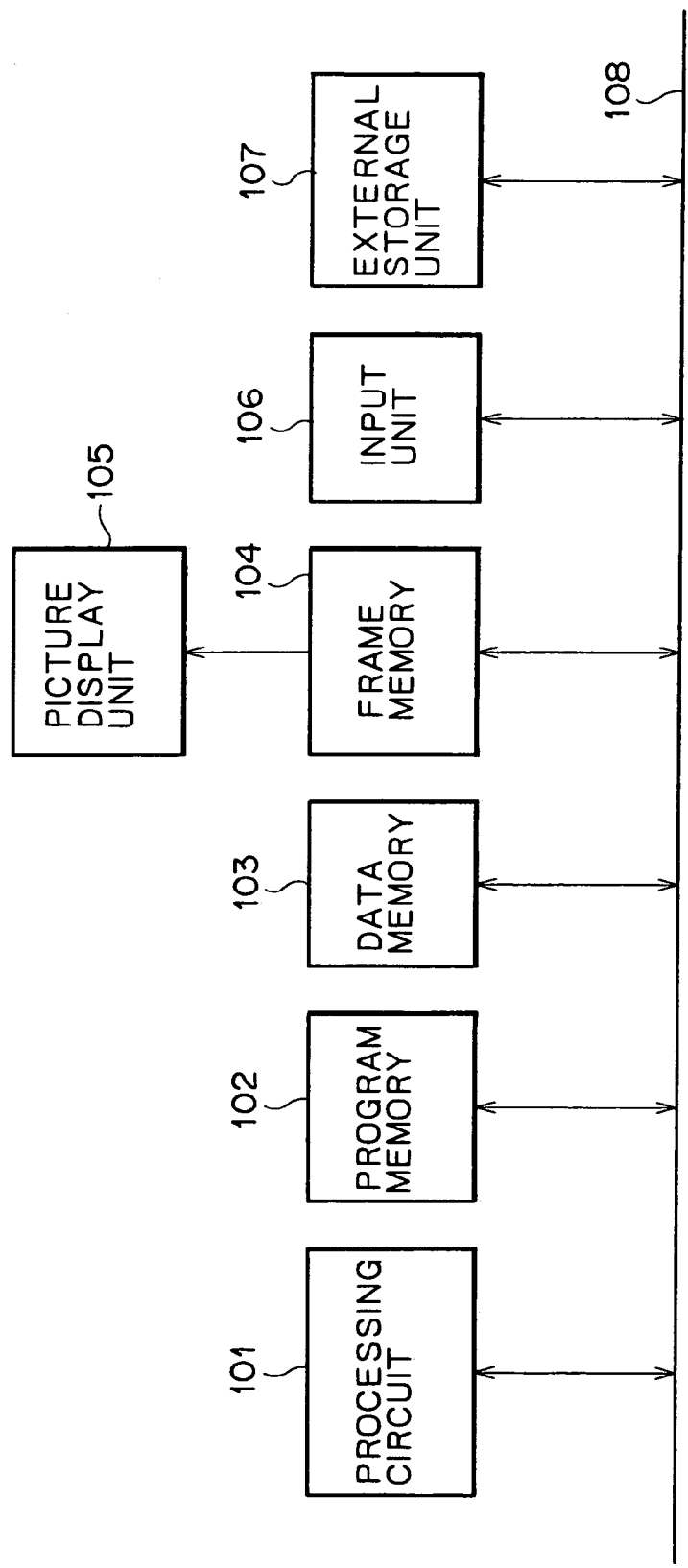
FIG. 1 is a block diagram showing pieces of hardware of a 3-dimensional-model-processing apparatus provided by the present invention.

FIG. 1 shows a block diagram of pieces of hardware of a control means of a 3-dimensional-model-processing system to which the present invention's 3-dimensional model-processing apparatus and 3-dimensional model-processing method can be applied.

As shown in FIG. 1, the 3-dimensional model-processing system includes main components such as a processing circuit 101, a program memory 102, a data memory 103, a frame memory 104, a picture display unit 105, an input unit 106, and an external storage unit 107. The processing circuit 101, the program memory 102, the data memory 103, the frame memory 104, the input unit 106, and the external storage unit 107 are connected to each other by a bus 108 in a configuration allowing data to be exchanged among them through the bus 108. The processing circuit 101 is a CPU (central processing unit) for executing a variety of processing programs to carry out, among other processes, the present invention's processing to grasp a 3-dimensional model. The program memory 102 includes a RAM (random-access memory) and a ROM (read-only memory) which are used for storing the processing programs. The data memory 103 is typically a RAM for storing processed data. The frame memory 104 is used for storing video information for displaying a 3-dimensional space including a 3-dimensional model and a tool. The picture display unit 105 is used for displaying a video signal stored in the frame memory 104 on a display device. Representatives of the display device include a computer display unit and an HMD (head mount display) unit. The input unit 106 is used for inputting measurement values generated by a variety of input devices. The external storage unit 107 is used for storing programs and information on a 3-dimensional model.

The external storage unit 107 is a secondary storage device used for storing programs and information on a 3-dimensional model as described above. A representative of the secondary storage device is a hard disc. Information required in processing carried out by execution of a program can also be stored in the external storage unit 107. Examples of such information are information on a 3-dimensional model and the state of a grasp tool which are stored also in the data memory 103.

The input unit 106 acquires measurement values generated by a variety of input devices as described above. To be more specific, the input unit 106 receives measurement values generated by a 3-dimensional input device such as a 3-dimensional sensor or a 3-dimensional mouse and used for updating the position and the posture of the grasp tool. Instead of a 3-dimensional input device, a 2-dimensional input device such as a mouse and a tablet can also be used. The input unit 106 also acquires an on/off state of a push button or the like. The input unit 106 acquires an on/off state of a simple push button, a mouse button, a keyboard or an on/off switch, for example. In the following description, a phrase saying: "A button is pressed" means that the button transits from an off state to an on state. On the other hand, a phrase saying: "A button is released" means that the button reversely transits from an on state to an off state. A phrase saying: "A button is clicked" means that the button is released right after being pressed. A command entered by carrying out an operation to press, release or click a button is referred to as an event input.

The processing circuit 101 updates the position and the posture of the grasp tool on the basis of measurement values obtained by the input unit 106. If necessary, the processing circuit 101 also updates information on 3-dimensional models, which is stored in the data memory 103. The state of the grasp tool can be a state of controlling a 3-dimensional model of an operated object or a state of controlling no 3-dimensional model. The former state is referred to as a grasping state while the latter one is called an non-grasping state. The verb "grasp" used in the following description means a transition from a non-grasping state to a grasping state of controlling a 3-dimensional model of an operated object. On the other hand, the phrase of "release a grasp" means the opposite transition. In addition, unless otherwise specified, the technical term "tool" implies a grasp tool.

Figure 2:
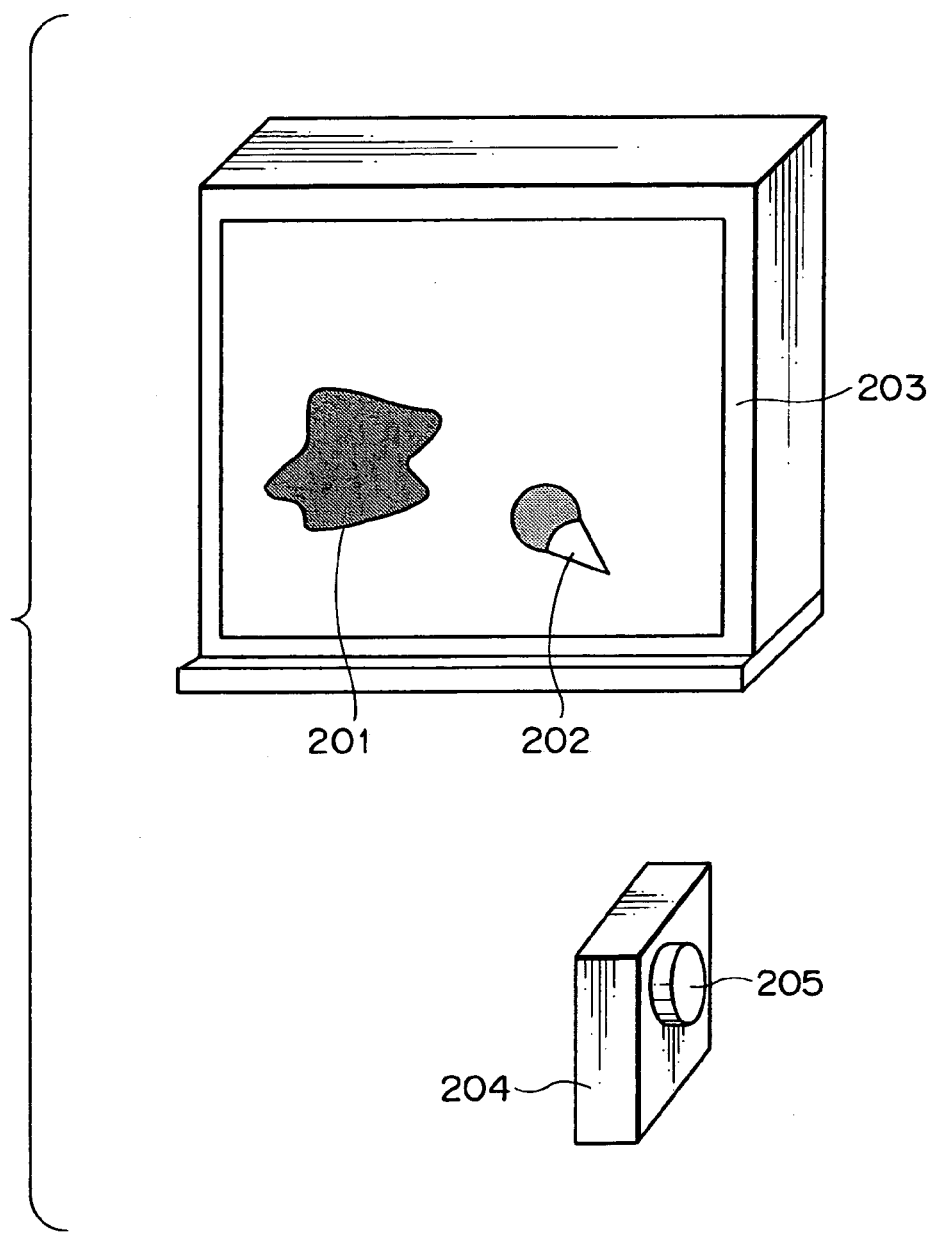
FIG. 2 is a diagram showing a display of the 3-dimensional-model-processing apparatus provided by the present invention and a typical configuration of a sensor.

FIG. 2 is a diagram showing a display of the 3-dimensional-model-processing system and a typical configuration of a 3-dimensional sensor 204. In the 3-dimensional-model-processing system, the 3-dimensional sensor 204 having a button 205 is used to operate a grasp tool 202 appearing on a monitor (display unit) 203 as a computer graphic as well as change the position of a 3-dimensional model 201 and information on the posture of the 3-dimensional model 201.

By operating the 3-dimensional sensor 204, the user is capable of arbitrarily controlling information on a position and a posture, which is output by the 3-dimensional sensor 204. The 3-dimensional sensor 204 outputs information on the position and the posture, which are changed by operating the 3-dimensional sensor 204. A grasp-state-setting process is a process of taking a relationship between the sensor-generated information on the position and the posture of the 3-dimensional sensor 204 and information on the position and the posture of the 3-dimensional model 201 appearing on the display unit 203 as a constraint relation. The 3-dimensional model-processing apparatus provided by the present invention carries out the grasp-state-setting process on the basis of a 3-dimensional position relationship between the 3-dimensional position of the 3-dimensional model 201 appearing on the display unit 203 and the 3-dimensional position of the tool 202 appearing on the display unit 203 for the 3-dimensional sensor 204. In actuality, it is control means that carries out the grasp-state-setting process. The control means includes the processing circuit 101 shown in FIG. 1 and the like.

The following description explains a plurality of embodiments each implementing the grasp-state-setting process based on a 3-dimensional position relationship between the 3-dimensional position of the 3-dimensional model 201 appearing on the display unit 203 and the 3-dimensional position of the tool 202 appearing on the display unit 203 for the 3-dimensional sensor 204. In the embodiments, all tools are each capable of rotating and moving a 3-dimensional model grasped by the tool to be operated while maintaining a posture relation between the tool and the 3-dimensional model and maintaining the position of the 3-dimensional model relative to the tool after the 3-dimensional model is grasped and before the 3-dimensional model is released. That is to say, while the tool is grasping the 3-dimensional model, the tool and the 3-dimensional model together form a single rigid body. It should be noted that the grasp tool appearing on the display unit may have any arbitrary shape.

Figure 3:
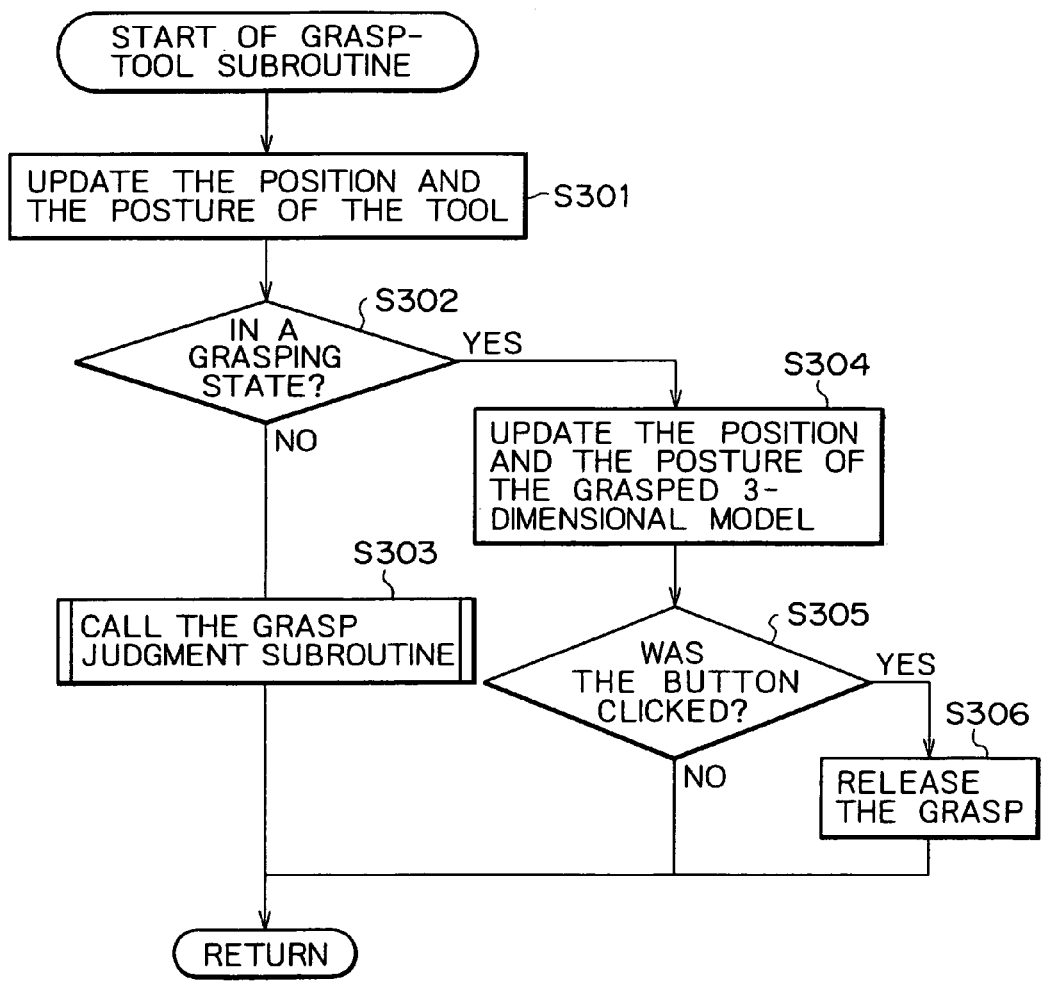
FIG. 3 is a flowchart representing a procedure to start and end grasp processing in the 3-dimensional-model-processing apparatus provided by the present invention.

FIG. 3 is a flowchart representing a subroutine of the operation of a grasp tool. The grasp-tool subroutine is invoked by the 3-dimensional-model-processing system at time intervals or in the event of a hardware interrupt. With the grasp-tool subroutine not activated, the 3-dimensional-model-processing system may carry out processing other than the processing represented by the subroutine. In addition, the 3-dimensional-model-processing system is initialized before the grasp-tool subroutine is invoked for the first time.

The grasp-tool subroutine is explained by referring to the flowchart shown in FIG. 3. As shown in the figure, the flowchart begins with a step S301 at which the position and the posture of the tool are updated on the basis of measurement values obtained from the input unit 106. The flow of the subroutine then goes on to a step S302 to form a judgment as to whether or not the tool is in a grasping state. If the tool is in a non-grasping state of grasping no 3-dimensional model, the flow of the subroutine goes on to a step S303 at which a grasp judgment subroutine is called to form a judgment as to whether or not a 3-dimensional model exists and, if necessary, an existing 3-dimensional model, if any, is grasped. If the result of the judgment formed at the step S302 indicates that the tool is in a grasping state of grasping a 3-dimensional model, on the other hand, the flow of the subroutine goes on to a step S304 at which the position and the posture of the 3-dimensional model are updated so that the relative position and the posture relation of the grasped 3-dimensional model remain unchanged. The flow of the subroutine then goes on to a step S305 to form a judgment as to whether or not a relevant button has been clicked. If the relevant button has been clicked, the flow of the subroutine goes on to a step S306 at which the grasping state is terminated. In the termination of a grasping state, the grasped 3-dimensional model is merely released, that is, the grasped 3-dimensional model is left at the present position thereof. As an alternative, the grasped 3-dimensional model may also be released after a transformation such as some movement or some rotation. The grasp judgment subroutine called at the step S303 is further exemplified by the following embodiments.

First Embodiment

A first embodiment implements the grasp judgment subroutine, grasping a 3-dimensional model when a button assigned to a tool existing inside the 3-dimensional model is clicked. In order to grasp a 3-dimensional model in this embodiment, it is necessary to move the tool to the inside of the 3-dimensional model and click the button.

Thus, in this embodiment, the tool is concealed in the 3-dimensional model. As a result, if a plurality of 3-dimensional models are superposed on each other, it is difficult to determine which 3-dimensional model contains the tool and, thus, which 3-dimensional model is to be grasped when the button is clicked. By viewing only the display appearing on the display unit, it is also difficult to form a judgment as to whether or not the tool is put correctly in the depth direction inside the 3-dimensional model to be operated. In order to solve these problems, in this embodiment, a 3-dimensional model satisfying a condition for being grasped upon a click operation of the button is clearly expressed in the grasping operation so as to allow the user to identify the 3-dimensional model being grasped.

A 3-dimensional model satisfying a condition for being grasped upon a click operation of the button is referred to as a graspable 3-dimensional model. Clear expressions of a 3-dimensional model being grasped include a highlighted display of the 3-dimensional model being operated, a display of a special icon, a display of a bounding box and transparent displays of 3-dimensional models other than the 3-dimensional model being grasped. It should be noted that a bounding box is an area prescribed by a smallest rectangle (2-dimension) or a smallest cube (3-dimension), which includes the body being operated.

Figure 4:
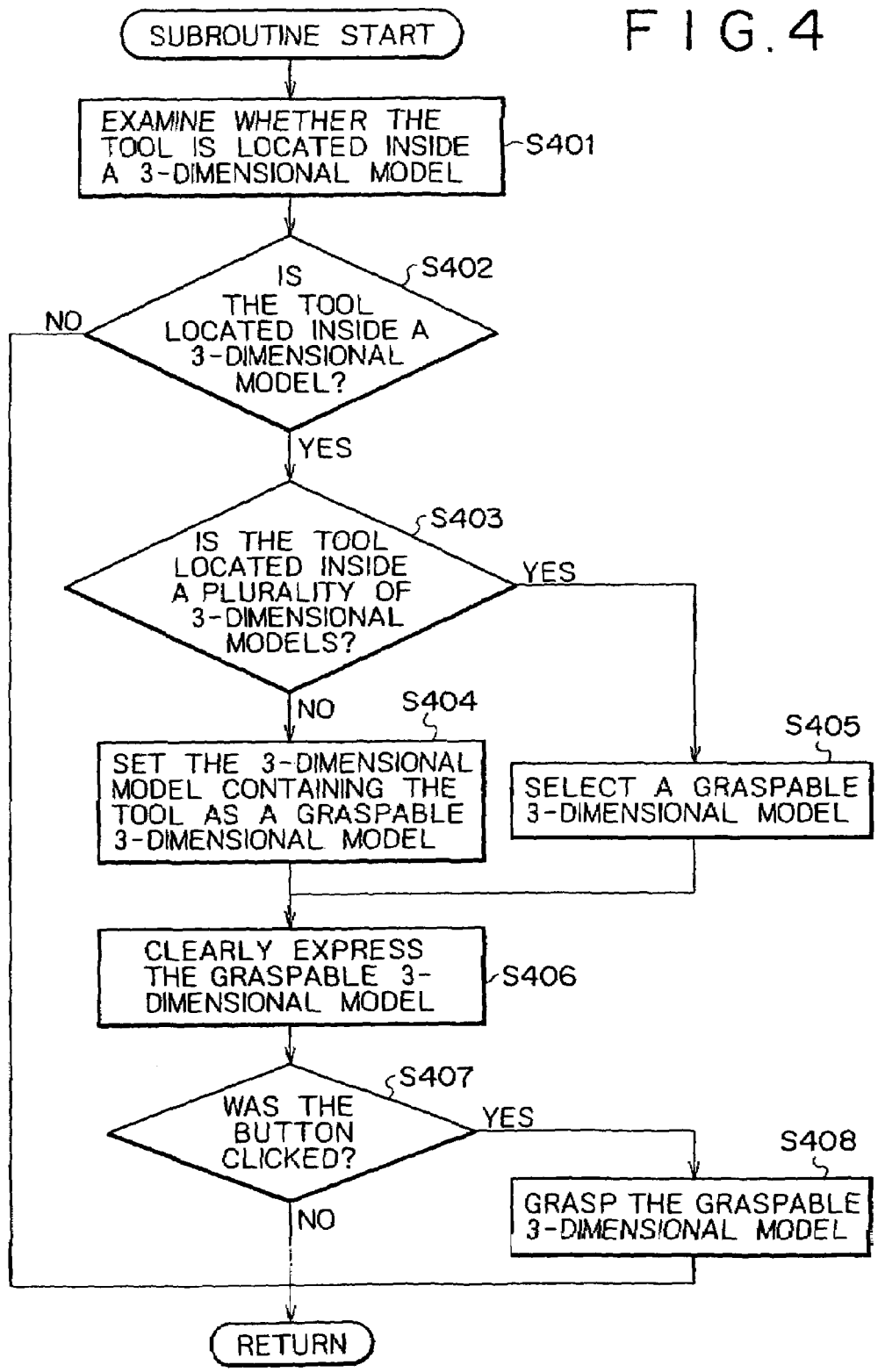
FIG. 4 is a flowchart representing a first procedure of grasp judgment processing in the 3-dimensional-model-processing apparatus provided by the present invention.

FIG. 4 is a flowchart representing a grasp judgment subroutine according to this embodiment. As shown in the figure, the flowchart begins with a step S401 at which the location of the tool is examined. The flow of the subroutine then goes on to a step S402 to form a judgment as to whether the tool is located inside one of 3-dimensional models. More specifically, as one technique of forming such a judgment, the tool is examined to determine whether or not the tool is located inside the area formed by the shape of a 3-dimensional model, that is, whether or not the tool is located inside the internal area of the 3-dimensional model, whether or not the tool is located inside a bounding box or whether or not the tool is located within a predetermined distance from the center of a 3-dimensional model, that is, whether or not the tool is located inside a bounding sphere expressed as a smallest sphere including the 3-dimensional model. If the tool is not located inside any of the 3-dimensional models, the subroutine is terminated. If the tool is located inside one or more 3-dimensional models, on the other hand, the flow of the subroutine goes on to a step S403.

Processing is carried out at the step S403 to form a judgment as to whether or not the tool is located inside a plurality of 3-dimensional models. If the tool is located inside only one 3-dimensional model, the flow of the subroutine goes on to a step S404 at which the 3-dimensional model containing the tool is taken as a graspable 3-dimensional model. The flow of the subroutine then goes on to a step S406. If the result of the judgment formed at the step S403 indicates that the tool is located inside a plurality of 3-dimensional models, on the other hand, the flow of the subroutine then goes on to a step S405 at which a graspable 3-dimensional model is selected among the 3-dimensional models containing the tool. In one method for selecting a graspable 3-dimensional model, a 3-dimensional model with a local-coordinate center or a bounding-box center thereof closest to the position of the tool is chosen. As a possible alternative, an order number is assigned to each of the 3-dimensional models containing the tool in advance and one or more 3-dimensional models are selected starting with the first one in the order. As another alternative, all the 3-dimensional models containing the tool are selected. It should be noted, however, that techniques for selecting a graspable 3-dimensional model are not limited to these methods. Instead, a graspable 3-dimensional model can be selected by carrying out a process conforming to rules set in advance. At the next step S406, the selected graspable 3-dimensional model is clearly expressed. The flow of the subroutine then goes on to a step S407 to form a judgment as to whether or not the button assigned to the tool has been clicked. If the button assigned to the tool has been clicked, the flow of the subroutine then goes on to a step S408 at which the graspable 3-dimensional model is grasped.

In the embodiment described above, the button is operated by being clicked. It should be noted, however, that a 3-dimensional model can also be grasped only while the button is being pressed and ungrasped as soon as the button is released.

Also note that it is possible to omit the processing carried out at the step S406 of the flowchart shown in FIG. 4 to clearly express a graspable 3-dimensional model.

Second Embodiment

A second embodiment implements the grasp judgment subroutine, grasping a 3-dimensional model when a button assigned to a tool in contact with a surface of the 3-dimensional model is clicked.

After the tool has been brought into contact with the surface of the 3-dimensional model, the tool can be moved to crawl over the surface of the 3-dimensional model, starting from the original position of the tool in a state of no restrictions.

Figure 5:
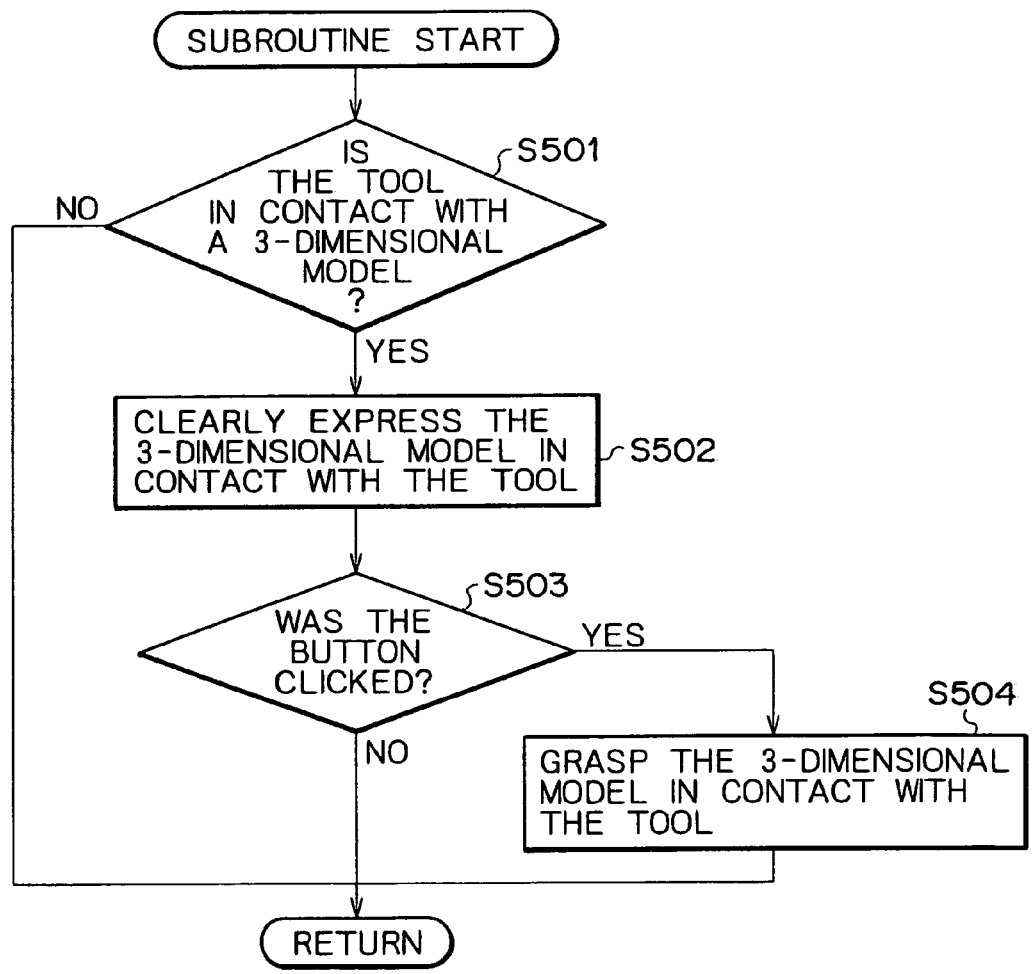
FIG. 5 is a flowchart representing a second procedure of the grasp judgment processing in the 3-dimensional-model-processing apparatus provided by the present invention.

FIG. 5 is a flowchart representing the operation of the second embodiment. As shown in the figure, the flowchart begins with a step S501 to form a judgment as to whether or not the tool has been brought into contact with a surface of a 3-dimensional model. If the tool has not been brought into contact with a surface of a 3-dimensional model, the operation is ended. If the tool has been brought into contact with a surface of a 3-dimensional model, on the other hand, the flow of the subroutine goes on to a step S502 at which the 3-dimensional model in contact with the tool is expressed clearly. In one method of clearly expressing a 3-dimensional model, the same technique as the first embodiment can be adopted. The flow of the subroutine then goes on to a step S503 to form a judgment as to whether or not the button assigned to the tool has been clicked. If the button assigned to the tool has been clicked, the flow of the subroutine then goes on to a step S504 at which the 3-dimensional model in contact with the tool is grasped.

In the embodiment described above, the button is operated by being clicked. It should be noted, however, that a 3-dimensional model can also be grasped only while the button is being pressed and ungrasped as soon as the button is released. In addition, it is also possible to omit the processing carried out at the step S502 of the flowchart shown in FIG. 5 to clearly express a graspable 3-dimensional model.

Third Embodiment

Figure 6:
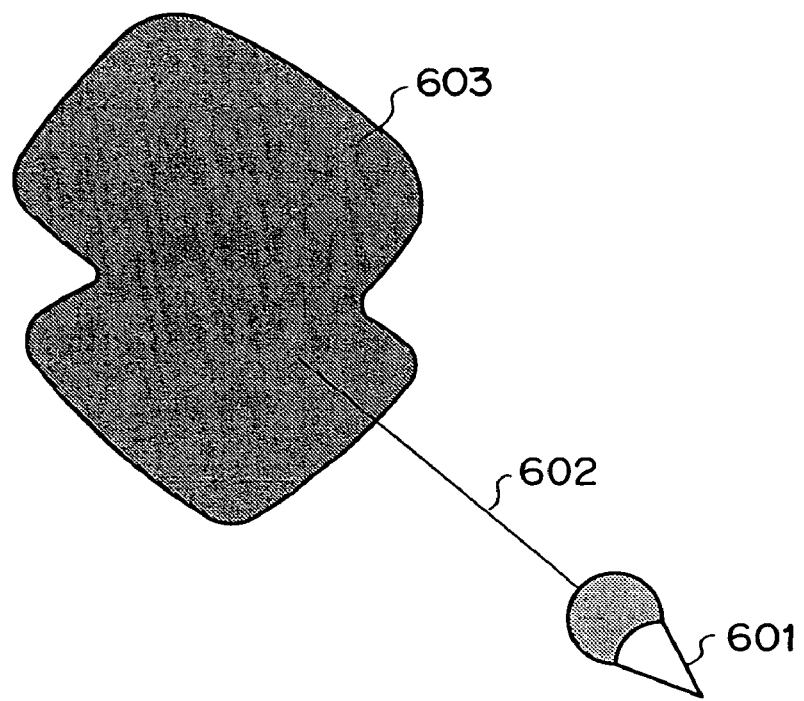
FIG. 6 is an explanatory diagram outlining use of an optical beam in grasp judgment processing in the 3-dimensional-model-processing apparatus provided by the present invention.

A third embodiment implements the grasp judgment subroutine, allowing a 3-dimensional model to be grasped even if the 3-dimensional model is separated away from a tool. FIG. 6 is a diagram showing the concept adopted by the third embodiment. In this configuration, a straight line or an optical beam 602 representing the orientation of a tool 601 is displayed with the tool 601 used as a starting point and, when a button assigned to the tool 601 is clicked, a 3-dimensional model 603 crossed by the optical beam 602 is grasped. In an operation to grasp the 3-dimensional model 603 being operated, control may be executed to pull the 3-dimensional model 603 toward the position of the tool 601 and place at a location where the 3-dimensional model 603 comes in contact with the tool 601. As an alternative, control is executed to take the local-coordinate center or the bound-box center of the 3-dimensional model 603 to the position of the tool 601. As another alternative, the position of the 3-dimensional model 603 relative to the tool 601 is sustained with the posture of the 3-dimensional model 603 maintained as it is. If the optical beam 602 does not cross a 3-dimensional model 603, nothing will happen even if the button 601 is clicked.

Figure 7:
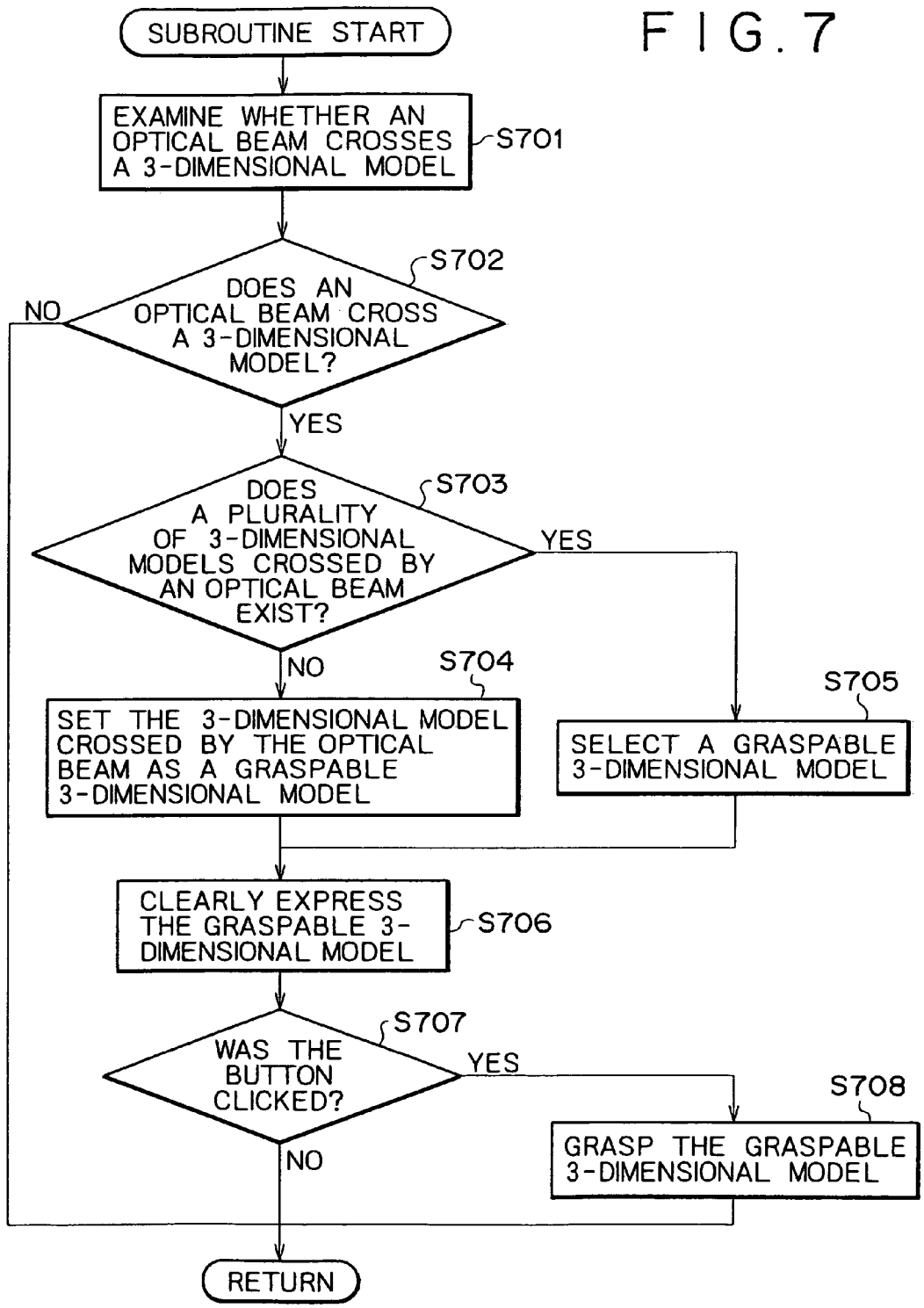
FIG. 7 is a flowchart representing a third procedure of the grasp judgment processing in the 3-dimensional-model-processing apparatus provided by the present invention.

FIG. 7 is a flowchart representing the operation of the third embodiment. As shown in the figure, the flowchart begins with a step S701 at which the optical beam 602 is traced to find an intersection with a 3-dimensional model. Then, the flow of the subroutine goes on to a step S702 to form a judgment as to whether or not the optical beam 602 crosses a 3-dimensional model. If the optical beam 602 does not cross any 3-dimensional model, the operation is ended. Otherwise, the flow of the subroutine goes on to a step S703 to form a judgment as to whether or not the optical beam 602 crosses a plurality of 3-dimensional models. If the optical beam 602 crosses only one 3-dimensional model, the flow of the subroutine goes on to a step S704 at which the crossed 3-dimensional model is taken as a graspable 3-dimensional model. If the optical beam 602 crosses a plurality of 3-dimensional models, on the other hand, the flow of the subroutine goes on to a step S705 at which a graspable 3-dimensional model is selected among the crossed 3-dimensional models. As a selection standard, it is natural to select a graspable 3-dimensional model closest to the tool 601. As an alternative method of selecting a graspable 3-dimensional model or graspable 3-dimensional models, it is also possible to choose a 3-dimensional model closest to the tool 601 among those separated away by at least a predetermined distance along the optical beam 602 from the tool 601, a 3-dimensional model farthest from the tool 601 or all crossed 3-dimensional models. As another alternative, a graspable 3-dimensional model or graspable 3-dimensional models are selected by adopting one of the alternative methods, which is determined on a case-by-case basis. At the next step S706, the selected graspable 3-dimensional model is clearly displayed by adoption of typically the same clear-expression technique as the first embodiment. The flow of the subroutine then goes on to a step S707 to form a judgment as to whether or not the button assigned to the tool 601 has been clicked. If the button assigned to the tool 601 has been clicked, the flow of the subroutine goes on to a step S708 at which the selected graspable 3-dimensional model is grasped.

In the embodiment described above, the button is operated by being clicked. It should be noted, however, that a 3-dimensional model can also be grasped only while the button is being pressed and ungrasped as soon as the button is released. In addition, it is also possible to omit the processing carried out at the step S706 of the flowchart shown in FIG. 7 to clearly express a graspable 3-dimensional model.

Fourth Embodiment

Figure 8A:
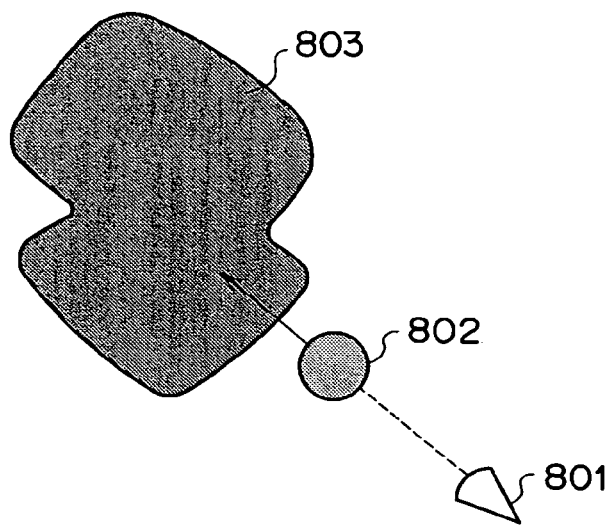
FIGS. 8A and 8B are explanatory diagrams outlining use of a bullet in grasp judgment processing in the 3-dimensional-model-processing apparatus provided by the present invention.
Figure 8B:
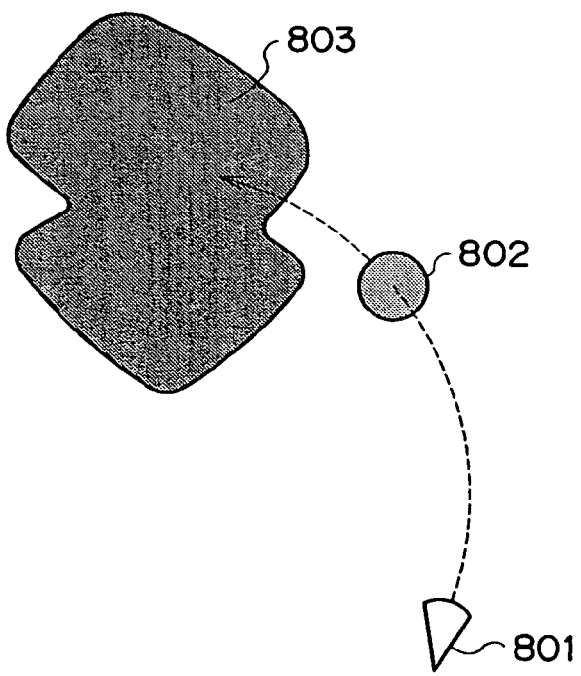

A fourth embodiment implements the grasp judgment subroutine, also allowing a 3-dimensional model to be grasped even if the 3-dimensional model is separated away from a tool. FIGS. 8A and 8B are diagrams showing the concept adopted by the fourth embodiment. In this embodiment, a tool 801 grasps a 3-dimensional model 803 colliding with a piece of substance or a bullet 802 shot from the tool 801 in a specific direction. In the fourth embodiment, if the bullet 802 shot from the tool 801 along a straight line or a curve, which is set in advance, collides with a 3-dimensional model 803, processing is carried out to take the colliding 3-dimensional model 803 as a graspable 3-dimensional model. In the following description, while a flying piece of substance is used as the bullet 802, the bullet 802 can have any arbitrary shape. A flying piece of substance other than the bullet 802 can also be used.

In the operation to grasp the 3-dimensional model 803 being operated, control may be executed to pull the 3-dimensional model 803 toward the position of the tool 801 and firmly place the 3-dimensional model 803 on the tool 801. Instead of pulling the 3-dimensional model 803, the position of the 3-dimensional model 803 relative to the tool 801 is sustained with the posture of the 3-dimensional model 803 maintained as it is.

In the case of the third embodiment, the optical beam 602 shown in FIG. 6 is a straight line. In the case of the fourth embodiment, the locus of the shot bullet 802 can have a straight or parabolic shape or another curved shape. In an example shown in FIG. 8B, for instance, the piece of substance shot from the tool 801 collides with the 3-dimensional model 803 after traveling along a curved, and the colliding 3-dimensional model 803 is then grasped. As an alternative, the locus of the bullet 802 may be changed after the bullet 802 is shot from the tool 801 in dependence on a movement of the tool 801.

If the bullet 802 does not collide with any 3-dimensional model in its travel along a shooting distance determined in advance on the assumption that the valid shooting locus of the bullet 802 has a limit, no 3-dimensional model is grasped. In addition, the tool 801 may be in a state where the bullet 802 has been shot or in a state where the bullet 802 has not been shot.

FIG. 9 is a flowchart representing a grasp judgment subroutine used in the fourth embodiment. As shown in the figure, the flowchart begins with a step S901 at which a collision-target 3-dimensional model is clearly expressed without regard to whether or not the bullet 802 has been shot. A collision-target 3-dimensional model is a model with which the bullet 802 is supposed to collide later on provided that the position as well as the posture of the 3-dimensional model and the shooting locus traveled by the tool 801 do not change. As techniques among conceivable methods of clearly expressing a collision-target 3-dimensional model, an icon representing a point to be hit by the bullet 802 is displayed, or the display of the collision-target 3-dimensional model is put in a highlighted state. As an alternative, a bounding box is displayed. It should be noted, however, the conceivable methods are not limited to these techniques.

The flow of the subroutine then goes on to a step S902 to form a judgment as to whether or not the bullet 802 has been shot. If the bullet 802 has been shot, the flow of the subroutine goes on to a step S903 at which the position of the bullet 802 is updated from time to time. At the next step S904, the shooting locus of the bullet 802 is examined for the position of a 3-dimensional model. Then, the flow of the subroutine goes on to a step S905 to form a judgment as to whether or not the collision-target 3-dimensional model has been hit by the bullet 802. If the collision-target 3-dimensional model has been hit by the bullet 802, the flow of the subroutine goes on to a step S906 at which the collision-target 3-dimensional model is grasped. The tool 801 is then put into a state in which the bullet 802 has not been shot.

If the result of judgment formed at the step S905 indicates that the collision-target 3-dimensional model has not been hit by the bullet 802, on the other hand, the flow of the subroutine goes on to a step S907 to form a judgment as to whether or not the shot bullet 802 has traveled a distance exceeding a threshold value after leaving the tool 801. If the shot bullet 802 has traveled a distance exceeding a threshold value after leaving the tool 801, the flow of the subroutine goes on to a step S908 at which the bullet 802 is returned to the position prior to the operation to shoot the bullet 802 from the tool 801. The tool 801 is then put into a state in which the bullet 802 has not been shot. If the shot bullet 802 has not traveled a distance exceeding the threshold value after leaving the tool 801, on the other hand, the processing represented by the subroutine is ended without doing anything.

If the result of the judgment formed at the step S902 indicates that the bullet 802 has not been shot, on the other hand, the flow of the subroutine goes on to a step S909 to form a judgment as to whether or not the button assigned to the tool 801 has been clicked. If the button assigned to the tool has been clicked, the flow of the subroutine then goes on to a step S910 at which the bullet 802 is shot. The tool 801 is then put into a state in which the bullet 802 has been shot. In addition, it is possible to omit the processing carried out at the step S901 of the flowchart shown in FIG. 9 to clearly express a collision-target 3-dimensional model.

In the fourth embodiment, the operation carried out on the button is a click operation. As an alternative, there is also a method whereby, when the button is pressed, the bullet 802 is shot, being stuck on a surface of the 3-dimensional model at a position hit by the bullet 802 and, when the button is released, the 3-dimensional model is actually grasped. If a particular condition is satisfied with the bullet 802 stuck on the 3-dimensional model, the bullet 802 is returned to its original position and the grasping operation is canceled. The particular condition is satisfied, for example, in a case where the tool 801 is quickly pulled in a direction opposite to the shooting direction of the bullet 802 as if an operation to peel off the bullet 802 from the surface of the 3-dimensional model were carried out, or where the state of the bullet's being stuck on the surface lasts for a predetermined typical period of few seconds without being accompanied by processing to move and/or rotate the 3-dimensional model. In addition, the grasping operation can also be canceled by releasing the button with the bullet 802 shot but hitting no 3-dimensional model.

Figure 10:
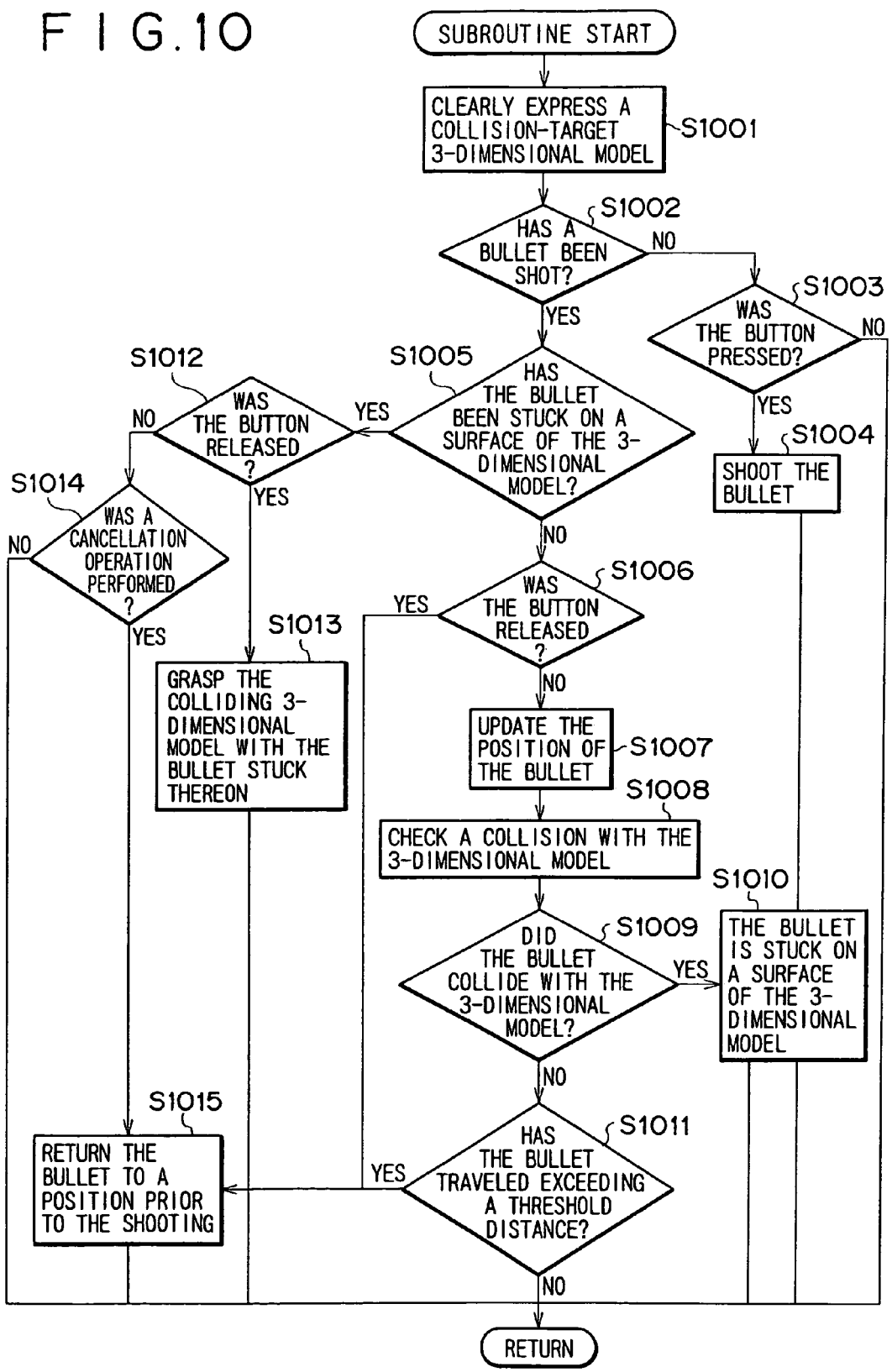
FIG. 10 is a flowchart representing a fifth procedure of the grasp judgment processing in the 3-dimensional-model-processing apparatus provided by the present invention.

FIG. 10 is a flowchart representing the operation of the fourth embodiment. The tool 801 can be in a state wherein the bullet 802 shot thereby is stuck or not stuck on a surface of the 2-model. As shown in the figure, the flowchart begins with a step S1001 at which a collision-target 3-dimensional model is expressed clearly. Any of the clear-expression methods adopted by the other embodiments will work in the fourth embodiment as well. The flow of the operation then goes on to a step S1002 to form a judgment as to whether or not the bullet 802 has been shot. If the bullet 802 has not been shot, the flow of the operation goes on to a step S1003 to form a judgment as to whether or not the button has been pressed. If the bullet 802 has been shot, on the other hand, the flow of the operation goes on to a step S1005. If the result of the judgment formed at the step S1003 indicates that the button has been pressed, the flow of the operation goes on to a step S1004 at which the bullet 802 is shot. If the result of the judgment formed at the step S1003 indicates that the button has not been pressed, on the other hand, the operation is ended.

As described above, if the result of the judgment formed at the step S1002 indicates that the bullet 802 has been shot, the flow of the operation goes on to a step S1005 to form a judgment as to whether or not the bullet 802 is stuck on a surface of a 3-dimensional model. If the bullet 802 is not stuck on a surface of a 3-dimensional model, the flow of the operation goes on to a step S1006 to form a judgment as to whether or not the button has been released. If the button has been released, the flow of the operation goes on to a step S1015 at which the bullet 802 is returned to a position prior to the shooting operation. Then, the tool 801 is put back in a state in which the bullet 802 has not been shot. If the button has not been released, on the other hand, the flow of the operation goes on to a step S1007 at which the position of the bullet 802 is updated from time to time. At the next step S1008, the locus of the bullet 802 is examined for the position of a 3-dimensional model. Then, the flow of the operation goes on to a step S1009 to form a judgment as to whether or not the bullet 802 has collided with a 3-dimensional model. If the bullet 802 has collided with a 3-dimensional model, the flow of the operation goes on to a step S1010 at which the bullet 802 is stuck on a surface of the 3-dimensional model at a location hit by the bullet 802. If the result of the judgment formed at the step S1009 indicates that the bullet 802 has not collided with a 3-dimensional model, on the other hand, the flow of the operation goes on to a step S1011 to form a judgment as to whether or not the bullet 802 has traveled along a distance exceeding a threshold value. If the bullet 802 has traveled along a distance exceeding the threshold value, the flow of the operation goes on to the step S1015 at which the bullet 802 is returned to a position prior to the shooting operation. Then, the tool 801 is put back in a state in which the bullet 802 has not been shot. The threshold value is determined by experience or may also be changed dynamically on a case-by-case basis.

If the result of the judgment formed at the step S1005 indicates that the bullet 802 is stuck on a surface of a 3-dimensional model, on the other hand, the flow of the operation goes on to a step S1012 to form a judgment as to whether or not the button has been released. If the button has been released, the flow of the operation goes on to a step S1013 at which the 3-dimensional model is grasped. Then, in some cases, processing may be started to move and/or rotate the 3-dimensional model till the tool 801 is put back in a state in which the bullet 802 has not been shot. If the result of the judgment formed at the step S1012 indicates that the button has not been released, on the other hand, the flow of the operation goes on to a step S1014 to form a judgment as to whether a cancellation has been carried out. If a cancellation has been carried out, the flow of the operation goes on to the step S1015 at which the bullet 802 is returned to a position prior to the shooting operation. Then, the tool 801 is put back in a state in which the bullet 802 has not been shot. An example of the cancellation is a case in which the tool 801 is quickly pulled in a direction opposite to the shooting direction of the bullet 802 as if an operation to peel off the bullet 802 from the surface of the 3-dimensional model were carried out, or a case in which the state of the bullet's being stuck on the surface lasts for a predetermined typical period of few seconds without being accompanied by processing to move and/or rotate the 3-dimensional model.

In the flowchart described above by referring to FIG. 10, the processing carried out at the step S1001 to clearly express a collision-target 3-dimensional model can be omitted. In addition, if a cancellation is not defined, the result of the judgment formed at the step S1014 is always NO.

Fifth Embodiment

Figure 11:
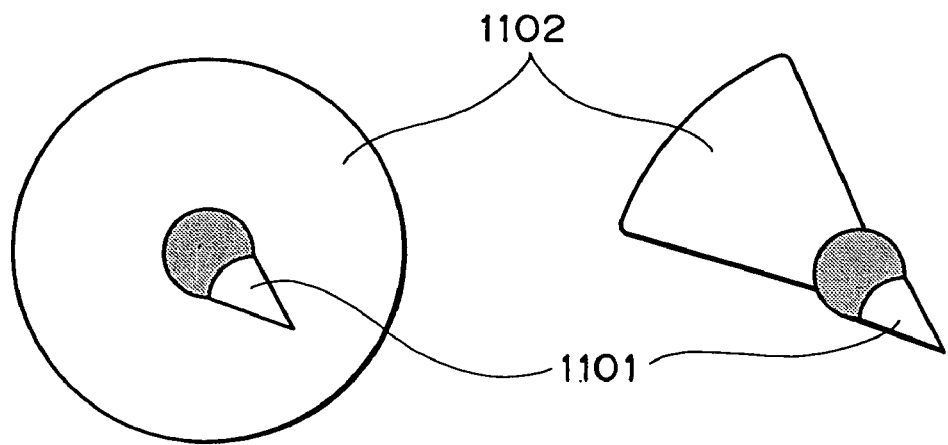
FIGS. 11A and 11B are explanatory diagrams outlining use of an effect range in grasp judgment processing in the 3-dimensional-model-processing apparatus provided by the present invention.

The fifth embodiment implements the grasp judgment subroutine representing a method of grasping a 3-dimensional model at a position close to a tool. The fifth embodiment has a configuration whereby a 3-dimensional model in a specific effect range with a tool used as a reference is pulled to be grasped when a button assigned to the tool is clicked. The effect range may be provided properly in accordance with the environment and adjusted dynamically in accordance with changes in condition. FIGS. 11A and 11B are diagrams showing a relation between the tool and the effect range.

FIG. 11A is a diagram showing a configuration wherein a 3-dimensional model within a predetermined distance from a tool 1101 in all directions is pulled toward the tool 1101. In this configuration, the tool 1101 operates as if the tool 1101 were a magnet. An effect range 1102 shown in FIG. 11A is set as the inside of a sphere with the tool 1101 serving as the center of the sphere.

On the other hand, FIG. 11B is a diagram showing a configuration wherein an effect range is limited to a specific direction of the tool 1101. In this configuration, the tool 1101 works like a vacuum cleaner to attract a 3-dimensional model located at a position in a specific direction only. An effect range 1102 shown in FIG. 11B is set as the inside of a cone with the vertex thereof coinciding with the tool 1101. If no 3-dimensional model exists in the effect range 1102 at the time the button is clicked, the tool 1101 does not attract any 3-dimensional model.

Figure 12:
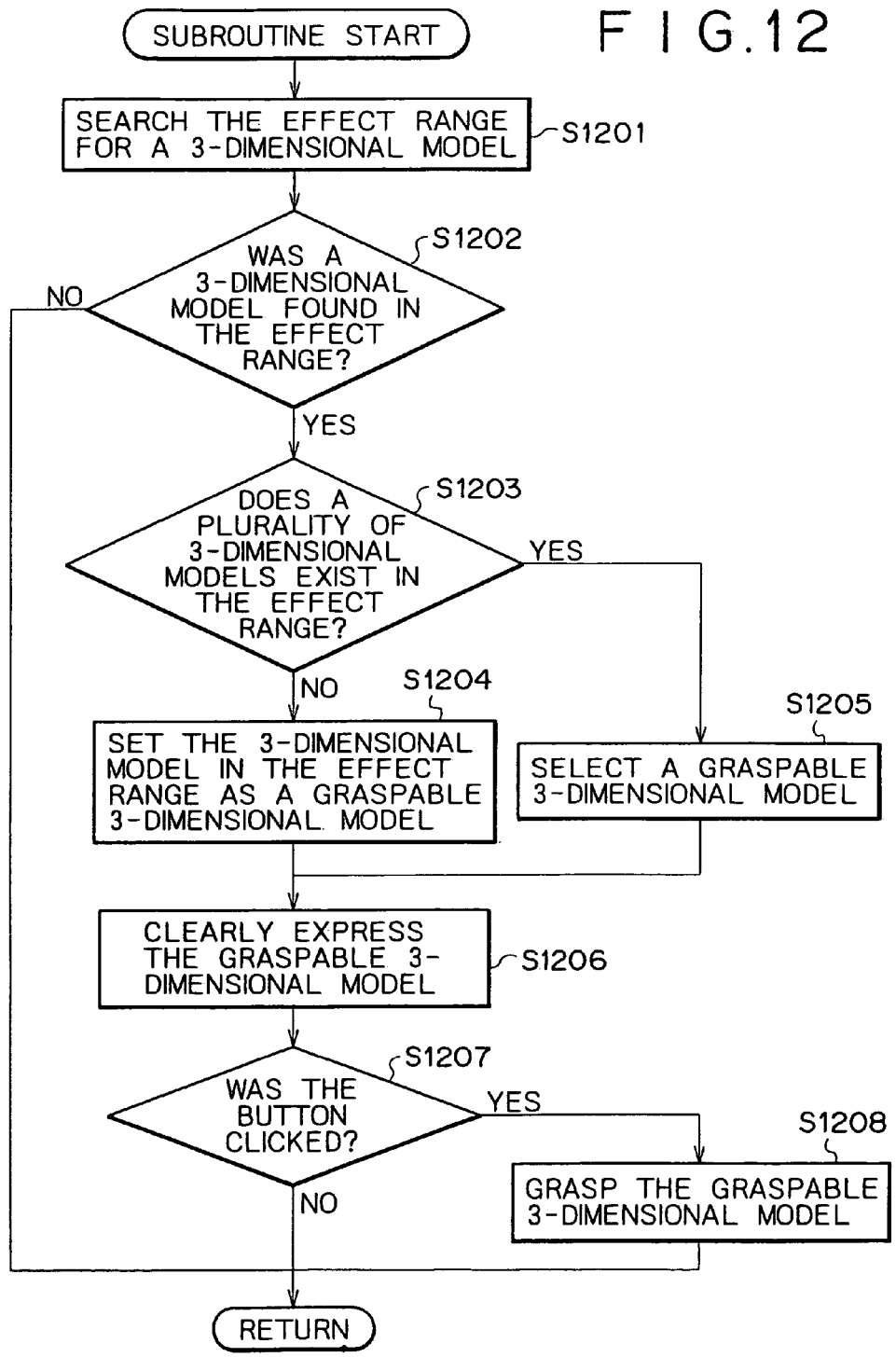
FIG. 12 is a flowchart representing a sixth procedure of the grasp judgment processing in the 3-dimensional-model-processing apparatus provided by the present invention.

FIG. 12 is a flowchart representing a grasp judgment subroutine employed in the fifth embodiment. As shown in FIG. 12, the flowchart begins with a step S1201 to search an effect range 1102 for a 3-dimensional model. A judgment as to whether or not a 3-dimensional model exists in an effect range 1102 is formed by adoption of a method for determining, for example, whether the local-coordinate center, the bounding-box center or the like of the 3-dimensional model is in the effect range 1102, whether a portion of the 3-dimensional model or the bounding box thereof coincides with the effect range 1102 or whether the entire 3-dimensional model or the entire bounding box thereof is included in the effect range 1102.

The flow of the routine then goes on to a step S1202 to form a judgment as to whether or not one or more 3-dimensional models exist in the effect range 1102. If no 3-dimensional models exist in the effect range 1102, the subroutine is ended. If at least one 3-dimensional models exists in the effect range 1102, on the other hand, the flow of the subroutine goes on to a step S1203 to form a judgment as to whether or not a plurality of 3-dimensional models exist in the effect range 1102. If only one 3-dimensional model exists in the effect range 1102, the flow of the subroutine goes on to a step S1204 at which the 3-dimensional model is taken as a graspable 3-dimensional model. If a plurality of 3-dimensional models exist in the effect range 1102, on the other hand, the flow of the subroutine goes on to a step S1205 at which a graspable 3-dimensional model is selected among those in the effect range 1102. As a selection standard, it is natural to select a graspable 3-dimensional model closest to the tool 1101. As an alternative method of selecting a graspable 3-dimensional model or graspable 3-dimensional models, it is also possible to choose a plurality of 3-dimensional models starting with one closest to the tool 1101. As another alternative, all graspable 3-dimensional models are each selected as a graspable 3-dimensional model. At the next step S1206, the selected graspable 3-dimensional model is clearly displayed by adoption of typically the same clear-expression technique as the first embodiment. The flow of the subroutine then goes on to a step S1207 to form a judgment as to whether or not the button assigned to the tool has been clicked. If the button assigned to the tool has been clicked, the flow of the subroutine then goes on to a step S1208 at which the selected graspable 3-dimensional model is grasped.

In the embodiment described above, the button is operated by being clicked. Note, however, that it is also possible to attract a 3-dimensional model as long as the button is being pressed and to attract no 3-dimensional model if the button is not being pressed. In this case, in order to grasp a 3-dimensional model, the button is pressed after the grasp tool is moved so that the 3-dimensional model to be operated is included in an attractable-model range. As an alternative, the button is pressed before the grasp tool is moved so that the 3-dimensional model to be operated is included in an attractable-model range.

In the flowchart described above by referring to FIG. 12, the processing carried out at the step S1206 to clearly express a graspable 3-dimensional model can be omitted.

Sixth Embodiment

A sixth embodiment is a combination of the embodiments described above. When a tool is located inside any of 3-dimensional models, the first embodiment is applied to grasp the 3-dimensional model. A 3-dimensional model not inside any 3-dimensional embodiment is grasped by adoption of the method implemented by the third, fourth or fifth embodiment. As a result, 3-dimensional models close to and far away from the tool can be grasped.

Seventh Embodiment

A tool may not be capable of passing through a surface of a 3-dimensional model. Thus, once a tool comes in contact with a surface of a 3-dimensional model like the second embodiment, the tool moves, crawling over the surface in a motion relative to the original position of the tool as is the case with the first embodiment. As a button assigned to the tool is pressed in this state, the 3-dimensional model coming in contact with the tool is grasped. With the tool not brought into contact with the 3-dimensional model, the 3-dimensional model is grasped by adoption of the method implemented by the third, fourth or fifth embodiment. As a result, a 3-dimensional model close to the tool can be grasped directly whereas a far 3-dimensional model can also be grasped.

Eighth Embodiment

In the first to seventh embodiments, the shape of a grasp tool itself is concealed while an operated 3-dimensional model is being grasped. In this case, the grasp tool is operated prior to a grasping operation. After the grasping operation, the 3-dimensional model itself is operated.

Figure 13:
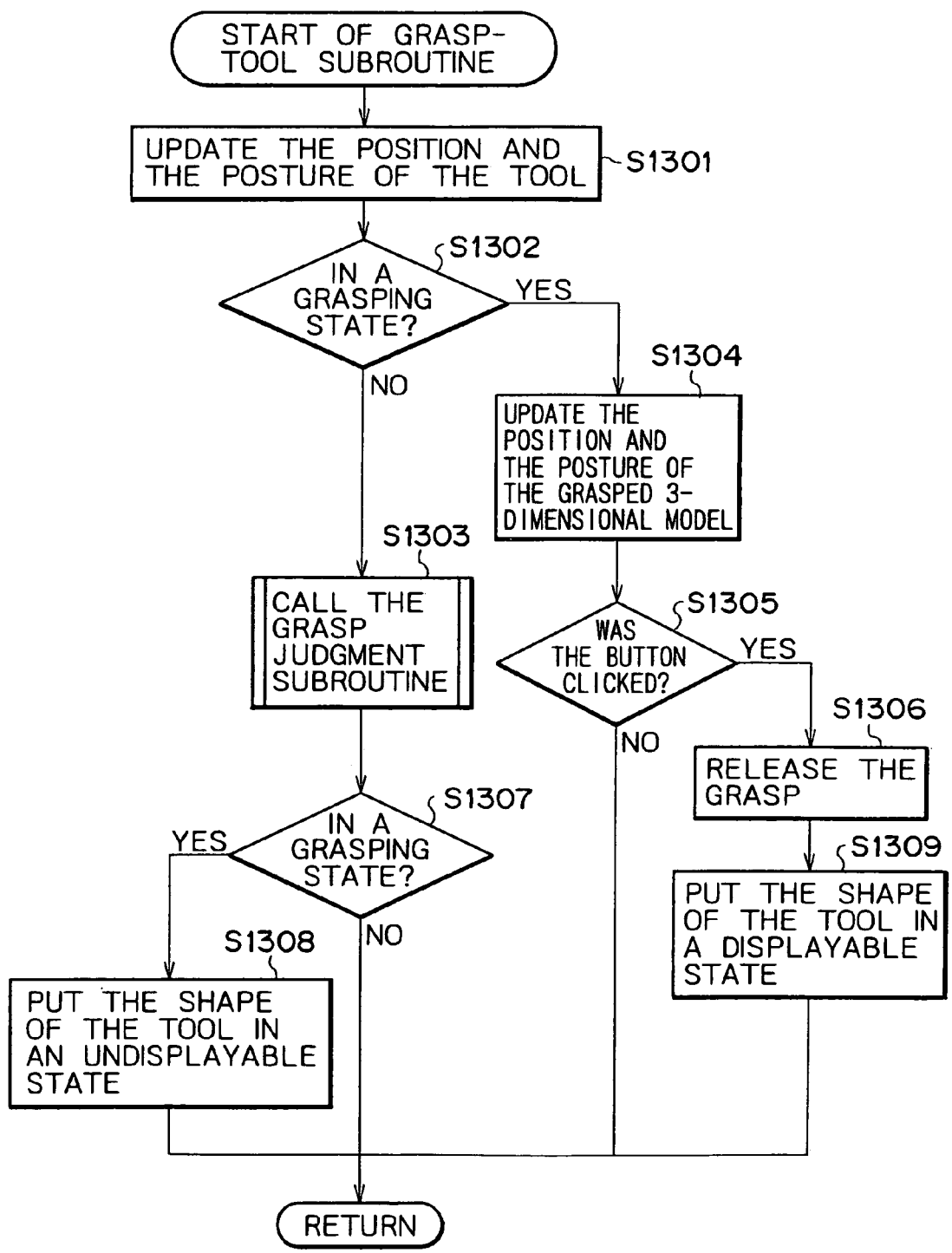
FIG. 13 is a flowchart representing a seventh procedure of the grasp judgment processing in the 3-dimensional-model-processing apparatus provided by the present invention.

FIG. 13 is a flowchart representing a grasp judgment subroutine employed in the eighth embodiment. A tool can be in a state of being displayed or being undisplayed. In a state of being displayed, the shape of the tool is displayed. In a state of being undisplayed, on the other hand, the shape of the tool is not displayed. The subroutine shown in FIG. 13 is all but the same as the grasp judgment subroutines of the first to seventh embodiments described earlier. In particular, the pieces of processing carried out at steps S1301 to S1306 are identical with the flowchart of the first embodiment shown in FIG. 3.

In the case of the eighth embodiment, steps 1307, 1308 and 1309 are added. After calling the grasp judgment subroutine at the step S1303, the flow of the subroutine goes on to the step S1307 to form a judgment as to whether or not whether or not the tool is in a grasping state. If the tool is in a grasping state, the flow of the subroutine goes on to the step S1308 at which the tool is put in a state of being undisplayed with the state thereof undisplayed. After the operation of grasping a 3-dimensional model carried out at the state S1306 is completed, the flow of the subroutine goes on to a step S1309 at which the tool is put in a state of being displayed to display the state thereof. It should be noted that, as the grasp judgment subroutine called at the step S1303, the grasp judgment subroutine of any of the first to seventh embodiments can be used.

In the 3-dimensional-model-processing apparatus shown in the figures described above, each processing program is stored in the program memory. It is worth noting that a processing program can also be stored in another storage medium such as a CD-ROM, an optical disc like a DVD-ROM, a CD-R, a CD-RW or a DVD-RAM, a magneto-optical (MO) disc, a magnetic disc like a hard disc or a floppy disc, a semiconductor memory like a memory stick, or tape media like a DAT or 8-mm tape. In the case of either storage medium used for storing a processing program prescribing any of the methods described before, there is provided a configuration wherein the processing program is loaded into a RAM from the storage medium for execution by a computer.

In accordance with the 3-dimensional model-processing apparatus and 3-dimensional model-processing method of the present invention described above, processing to grasp a 3-dimensional model is carried out in a configuration wherein a grasp tool is adapted to a 3-dimensional environment and a 3-dimensional model to be grasped is identified, making an operator capable of operating the tool intuitively and close to a sense of operating a real object.

In addition, in accordance with the 3-dimensional model-processing apparatus and 3-dimensional model-processing method of the present invention described above, processing to grasp a 3-dimensional model is carried out in a configuration wherein a 3-dimensional model is grasped by an optical beam emitted by a tool separated away from the 3-dimensional model or a bullet shot from the tool, or a 3-dimensional model in a predetermined effect range is grasped. Thus, a 3-dimensional model can be grasped without regard to the position of the tool. As a result, it is possible to implement a configuration offering merits of high operability and comprehensible processing.

Furthermore, by using the grasp tool capable of controlling the position as well as the posture of a 3-dimensional model with a high degree of freedom, it is possible to easily switch the object to be moved and rotated among a plurality of 3-dimensional models. Moreover, by virtue of a configuration wherein the shape of the grasp tool is concealed while a 3-dimensional model is being grasped, the operator is capable of carrying out processing to directly catch and operate the grasped 3-dimensional model while a grasp process is being performed.

Although the present invention has been described with reference to specific embodiments, those of skill in the art will recognize that changes may be made thereto without departing from the spirit and scope of the invention as set forth in the hereafter appended claims.

What is claimed is:

1. A 3-dimensional model-processing apparatus capable of processing a 3-dimensional model appearing on a display unit comprising:

a user controllable 3-dimensional sensor capable of generating information on a position and a posture of an appearance on the display unit; and a controller having a grasp-state-setting process of taking a relation between said sensor-generated information on a position and a posture of said 3-dimensional sensor and information on a position and a posture of said 3-dimensional model appearing on said display unit as a constraint relation on the basis of one of (a) a relation between a 3-dimensional position of said 3-dimensional model appearing on said display unit and the 3-dimensional position of a 3-dimensional tool appearing for said 3-dimensional sensor on said display unit and (b) a relation between a 3-dimensional posture of said 3-dimensional model appearing on said display unit and a 3-dimensional posture of said 3-dimensional tool appearing for said 3-dimensional sensor on said display unit, wherein said controller has a configuration for selecting a 3-dimensional model crossed by a straight optical beam generated in a specific direction by said tool appearing on said display unit and for carrying out said grasp-state-setting process on said selected 3-dimensional model.

2. A 3-dimensional model-processing apparatus capable of processing a 3-dimensional model appearing on a display unit comprising:

a user controllable 3-dimensional sensor capable of generating information on a position and a posture of an appearance on the display unit; and a controller having a grasp-state-setting process of taking a relation between said sensor-generated information on a position and a posture of said 3-dimensional sensor and information on a position and a posture of said 3-dimensional model appearing on said display unit as a constraint relation on the basis of one of (a) a relation between a 3-dimensional position of said 3-dimensional model appearing on said display unit and the 3-dimensional position of a 3-dimensional tool appearing for said 3-dimensional sensor on said display unit and (b) a relation between a 3-dimensional posture of said 3-dimensional model appearing on said display unit and a 3-dimensional posture of said 3-dimensional tool appearing for said 3-dimensional sensor on said display unit, wherein said controller has a configuration for selecting a 3-dimensional model hit by a flying object emanating in a specific direction from said tool appearing on said display unit and for carrying out said grasp-state-setting process on said selected 3-dimensional model.

3. A 3-dimensional model-processing apparatus according to claim 2, wherein said controller has a configuration which is used for executing control to display said flying object on said display unit as a flying object emanating from said tool appearing on said display unit along either a predetermined straight line or a predetermined curved line.

4. A 3-dimensional model-processing apparatus according to claim 2, wherein said controller has a configuration which is used for executing control to display said flying object stuck on a surface of a 3-dimensional model appearing on said display unit when said flying object hits said 3-dimensional model.

5. A 3-dimensional model-processing apparatus according to claim 2, wherein said controller has a configuration which is used for:

executing control to display said flying object stuck on a surface of a 3-dimensional model appearing on said display unit when said flying object hits said 3-dimensional model; and carrying out processing to move said 3-dimensional model with said flying object stuck on said surface thereof to a position of said tool.

6. A 3-dimensional model-processing apparatus according to claim 2, wherein said controller has a configuration which is used for: constraint relation on the basis of one of (a) a relation between a 3-dimensional position of said 3-dimensional model appearing on said display unit and the 3-dimensional position of a 3-dimensional tool appearing for said 3-dimensional sensor on said display unit and (b) a relation between a 3-dimensional posture of said 3-dimensional model appearing on said display unit and a 3-dimensional posture of said 3-dimensional tool appearing for said 3-dimensional sensor on said display unit;

wherein said controller has a configuration for executing control to display a specific 3-dimensional model subjected to said grasp-state-setting process by distinguishing said specific 3-dimensional model from other 3-dimensional models appearing on said display unit.

7. A 3-dimensional model-processing apparatus capable of processing a 3-dimensional model appearing on a display unit comprising:

a user controllable 3-dimensional sensor capable of generating information on a position and a posture of an appearance on the display unit; and controller having a grasp-state-setting process of taking a relation between said sensor-generated information on a position and a posture of said 3-dimensional sensor and information on a position and a posture of said 3-dimensional model appearing on said display unit as a constraint relation on the basis of one of (a) a relation between a 3-dimensional position of said 3-dimensional model appearing on said display unit and the 3-dimensional position of a 3-dimensional tool appearing for said 3-dimensional sensor on said display unit and (b) a relation between a 3-dimensional posture of said 3-dimensional model appearing on said display unit and a 3-dimensional posture of said 3-dimensional tool appearing for said 3-dimensional sensor on said display unit, wherein said controller has a configuration for identifying the area of a 3-dimensional model appearing on said display unit by recognizing a bounding-box area comprising said 3-dimensional model, an internal area of said 3-dimensional model or a bounding sphere displayed as a smallest sphere including said 3-dimensional model.

8. A 3-dimensional model-processing apparatus capable of processing a 3-dimensional model appearing on a display unit comprising:

a user controllable 3-dimensional sensor capable of generating information on a position and a posture of an appearance on the display unit; and a controller having a grasp-state-setting process of taking a relation between said sensor-generated information on a position and a posture of said 3-dimensional sensor and information on a position and a posture of said 3-dimensional model appearing on said display unit as a allowing a user to arbitrarily control information on a position and a posture of an appearance on the display unit, which is generated by a 3-dimensional sensor; and carrying out a grasp-state-setting process of taking a relation between said sensor-generated information on a position and a posture of said 3-dimensional sensor and information on a position and a posture of said 3-dimensional model appearing on said display unit as a constraint relation on either the basis of a relation between a 3-dimensional position of said 3-dimensional model appearing on said display unit and the 3-dimensional position of a 3-dimensional tool appearing for said 3-dimensional sensor on said display unit or on the basis of a relation between a 3-dimensional posture of said 3-dimensional model appearing on said display unit and a 3-dimensional posture of said 3-dimensional tool appearing for said 3-dimensional sensor on said display unit, wherein carrying out said grasp-state-setting process comprises:

selecting a 3-dimensional model hit by a flying object emanating in a specific direction from said tool appearing on said display unit; and carrying out said grasp-state-setting process on said selected 3-dimensional model.

9. A 3-dimensional model-processing method capable of processing a 3-dimensional model appearing on a display unit comprising:

allowing a user to arbitrarily control information on a position and a posture of an appearance on the display unit, which is generated by a 3-dimensional sensor; and carrying out a grasp-state-setting process of taking a relation between said sensor-generated information on a position and a posture of said 3-dimensional sensor and information on a position and a posture of said 3-dimensional model appearing on said display unit as a constraint relation on either the basis of a relation between a 3-dimensional position of said 3-dimensional model appearing on said display unit and the 3-dimensional position of a 3-dimensional tool appearing for said 3-dimensional sensor on said display unit or on the basis of a relation between a 3-dimensional posture of said 3-dimensional model appearing on said display unit and a 3-dimensional posture of said 3-dimensional tool appearing for said 3-dimensional sensor on said display unit, wherein carrying out said grasp-state-setting process comprises:

selecting a 3-dimensional model crossed by a straight optical beam generated in a specific direction by said tool appearing on said display unit; and carrying out said grasp-state-setting process on said selected 3-dimensional model.

10. A 3-dimensional model-processing method capable of processing a 3-dimensional model appearing on a display unit comprising:

executing control to display said flying object stuck on a surface of a 3-dimensional model appearing on said display unit when said flying object hits said 3-dimensional model; and carrying out processing to return said flying object from a stuck position on said surface of said 3-dimensional model to a position of said tool when a cancel input is received by said 3-dimensional sensor provided in advance.

11. A 3-dimensional model-processing method according to claim 10, wherein at carrying out said grasp-state-setting process, control is executed to display said flying object on said display unit as a flying object emanating from said tool appearing on said display unit along either a predetermined straight line or a predetermined curved line appearing on said display unit.

12. A 3-dimensional model-processing method according to claim 10, wherein at carrying out said grasp-state-setting process control is executed to display said flying object stuck on a surface of a 3-dimensional model appearing on said display unit when said flying object hits said 3-dimensional model.

13. A 3-dimensional model-processing method according to claim 10, wherein carrying out said grasp-state-setting process comprises:

executing control to display said flying object stuck on a surface of a 3-dimensional model appearing on said display unit when said flying object hits said 3-dimensional model; and carrying out processing to move said 3-dimensional model with said flying object stuck on said surface thereof to a position of said tool.

14. A 3-dimensional model-processing method according to claim 10, wherein carrying out said grasp-state-setting process comprises:

executing control to display said flying object stuck on a surface of a 3-dimensional model appearing on said display unit when said flying object hits said 3-dimensional model; and carrying out processing to return said flying object from a stuck position on said surface of said 3-dimensional model to a position of said tool when a cancel input is received by said 3-dimensional sensor provided in advance.

15. A 3-dimensional model-processing method capable of processing a 3-dimensional model appearing on a display unit comprising:

allowing a user to arbitrarily control information on a position and a posture of an appearance on the display unit, which is generated by a 3-dimensional sensor; and carrying out a grasp-state-setting process of taking a relation between said sensor-generated information on a position and a posture of said 3-dimensional sensor and information on a position and a posture of said 3-dimensional model appearing on said display unit as a constraint relation on either the basis of a relation between a 3-dimensional position of said 3-dimensional model appearing on said display unit and the 3-dimensional position of a 3-dimensional tool appearing for said 3-dimensional sensor on said display unit or on the basis of a relation between a 3-dimensional posture of said 3-dimensional model appearing on said display unit and a 3-dimensional posture of said 3-dimensional tool appearing for said 3-dimensional sensor on said display unit, wherein at carrying out said grasp-state-setting process the area of a 3-dimensional model appearing on said display unit is identified by recognizing a bounding-box area comprising one of said 3-dimensional model, an internal area of said 3-dimensional model and a bounding sphere displayed as a smallest sphere including said 3-dimensional model.

16. A 3-dimensional model-processing method capable of processing a 3-dimensional model appearing on a display unit comprising:

allowing a user to arbitrarily control information on a position and a posture of an appearance on the display unit, which is generated by a 3-dimensional sensor; and carrying out a grasp-state-setting process of taking a relation between said sensor-generated information on a position and a posture of said 3-dimensional sensor and information on a position and a posture of said 3-dimensional model appearing on said display unit as a constraint relation on either the basis of a relation between a 3-dimensional position of said 3-dimensional model appearing on said display unit and the 3-dimensional position of a 3-dimensional tool appearing for said 3-dimensional sensor on said display unit or on the basis of a relation between a 3-dimensional posture of said 3-dimensional model appearing on said display unit and a 3-dimensional posture of said 3-dimensional tool appearing for said 3-dimensional sensor on said display unit, wherein at carrying out said grasp-state-setting process control is executed to display a specific 3-dimensional model subjected to said grasp-state-setting process by distinguishing said specific 3-dimensional model from other 3-dimensional models appearing on said display unit.

* * * * *